(12) United States Patent
Heer et al.

(10) Patent No.: US 12,737,661 B2
(45) Date of Patent: Sep. 15, 2026

(54) QUANTUM COMPUTER SYSTEM AND METHOD OF OPERATING A QUANTUM COMPUTER CHIP

(71) Applicant: Rohde & Schwarz GmbH & Co. KG, Munich (DE)

(72) Inventors: Flavio Heer, Zurich (CH); Arsenii Krasnov, Zurich (CH); Fabian Schenkel, Zurich (CH); Christoph Ruehle, Zurich (CH); David Mueller, Zurich (CH); Fabian Pfaefflli, Zurich (CH); Remigius Mommsen, Zurich (CH); Tobias Thiele, Zurich (CH)

(73) Assignee: Rohde & Schwarz GmbH & Co. KG, Munich (DE)

( * ) Notice: Subject to any disclaimer, the term of this patent is extended or adjusted under 35 U.S.C. 154(b) by 67 days.

(21) Appl. No.: 18/826,681

(22) Filed: Sep. 6, 2024

(65) Prior Publication Data

US 2026/0073267 A1 Mar. 12, 2026

(51) Int. Cl.
*G06N 10/40* (2022.01)
*G06N 10/20* (2022.01)

(52) U.S. Cl.
CPC ............. *G06N 10/40* (2022.01); *G06N 10/20* (2022.01)

(58) Field of Classification Search
CPC ............................... G06N 10/20; G06N 10/40
USPC ..................................... 326/7; 505/150, 183
See application file for complete search history.

(56) References Cited

U.S. PATENT DOCUMENTS 8,170,211 B2 5/2012 Langer
10,379,420 B1 * 8/2019 Wang ...................... H03K 3/42

FOREIGN PATENT DOCUMENTS

EP 2036242 B1 12/2009

OTHER PUBLICATIONS

Arrazola et al, Quantum circuits with many photons on a programmable nanophotonic chip (Year: 2021)Nature. Mar. 2021 ; 591(7848).*
Bahrani et al, Wavelength Assignment in Hybrid Quantum-Classical Networks(Year: 2018) Scientific Reports: Feb. 22, 2018 Nature. com.*

* cited by examiner

*Primary Examiner* — Arnold M Kinkead
(74) *Attorney, Agent, or Firm* — CHRISTENSEN O'CONNOR JOHNSON KINDNESS PLLC

(57) ABSTRACT

A quantum computer system includes a control and analysis circuit, a transmission module, a plurality of qubits of a quantum computer chip, and a chip connection circuit. The control and analysis circuit is configured to generate a plurality of electrical signals for the plurality of qubits, and to analyze a plurality of electrical read-out signals received from the plurality of qubits. The chip connection circuit is configured to apply the plurality of electrical signals to the plurality of qubits, and to obtain the plurality of electrical read-out signals from the plurality of qubits. The transmission module includes an optical data connection, a first converter circuit, and a second converter circuit. The optical data connection connects the first converter circuit and the second converter circuit, wherein the optical data connection is configured to transmit optical signals between the first converter circuit and the second converter circuit.

16 Claims, 3 Drawing Sheets

10
12
control and
analysis circuit
26
transmission module
28
control signals
read-out request signals
read-out signals
first converter
circuit
32
optical control signals
optical read-out request signals
optical read-out signals
30
second
converter
circuit
35
RF signal circuit
34
16
24
14
22
quantum
computer chip
18,20
cryostat

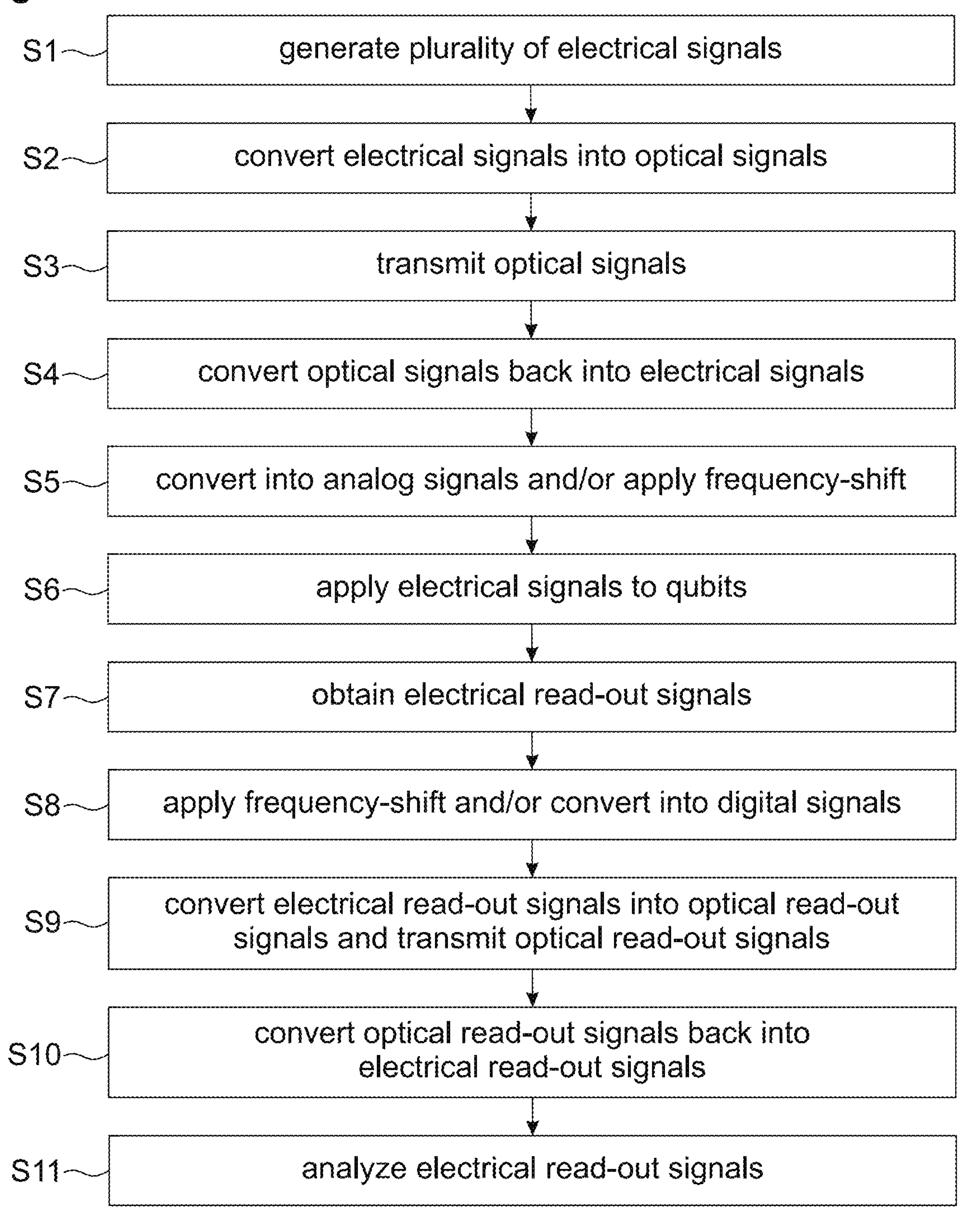
Fig. 4
S1
generate plurality of electrical signals
S2
convert electrical signals into optical signals
S3
transmit optical signals
S4
convert optical signals back into electrical signals
S5
convert into analog signals and/or apply frequency-shift
S6
apply electrical signals to qubits
S7
obtain electrical read-out signals
S8
apply frequency-shift and/or convert into digital signals
S9
convert electrical read-out signals into optical read-out signals and transmit optical read-out signals
S10
convert optical read-out signals back into electrical read-out signals
S11
analyze electrical read-out signals

QUANTUM COMPUTER SYSTEM AND METHOD OF OPERATING A QUANTUM COMPUTER CHIP

FIELD OF THE DISCLOSURE

Embodiments of the present disclosure generally relate to a quantum computer system. Embodiments of the present disclosure further relate to a method of operating a quantum computer chip.

BACKGROUND

Quantum computer chips are typically operated by generating electrical microwave signals in order to control the individual qubits of the quantum computer chip and in order to read out quantum states of the individual qubits.

With increasing number of qubits becoming available per quantum computer chip, the number of necessary data connections to control the qubits is also on the rise. Usually, these data connections are established as electrical conductors such as copper cables, which is not optimal for the scalability of the control equipment to higher number of qubits.

Thus, there is a need for a quantum computer system as well as for a method of operating a quantum computer chip that allow for a better scalability with the number of qubits to be controlled.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a quantum computer system. In an embodiment, the quantum computer system comprises a control and analysis circuit, a transmission module, a plurality of qubits of a quantum computer chip, and a chip connection circuit. The control and analysis circuit is configured to generate a plurality of electrical signals for the plurality of qubits of the quantum computer chip. The control and analysis circuit further is configured to analyze a plurality of electrical read-out signals received from the plurality of qubits of the quantum computer chip. The chip connection circuit is configured to apply the plurality of electrical signals to the plurality of qubits of the quantum computer chip. The chip connection circuit further is configured to obtain the plurality of electrical read-out signals from the plurality of qubits of the quantum computer chip.

The transmission module comprises an optical data connection, a first converter circuit, and a second converter circuit. The optical data connection connects the first converter circuit and the second converter circuit. The optical data connection is configured to transmit optical signals between the first converter circuit and the second converter circuit. The first converter circuit is configured to convert the plurality of electrical signals generated by the control and analysis circuit into a plurality of optical signals. The second converter circuit is configured to convert the plurality of optical signals back into the plurality of electrical signals. The second converter circuit further is configured to convert the plurality of electrical read-out signals obtained by the chip connection circuit into a plurality of optical read-out signals. The first converter circuit further is configured to convert the plurality of optical read-out signals back into the plurality of electrical read-out signals.

The term "module" as used herein denotes a plurality of components, such as electrical circuits, optical components, or a combination of electrical circuits and optical components that are configured to perform a certain functionality.

The plurality of electrical signals generated by the control and analysis circuit for the plurality of qubits are understood to comprise electrical control signals and/or electrical read-out request signals. The electrical control signals are configured to control the respective qubits to enter a predetermined quantum state. The electrical read-out request signals are configured to initiate a read-out of the quantum states of the respective qubits.

The quantum computer system according to embodiments of the present disclosure is based on the idea to replace at least a portion of the data connections between the control and analysis circuit and the qubits of the quantum computer chip by an optical data connection. This replacement has several advantages, some of which are set forth herein.

Optical data connections generally allow for transmission of several signals per optical fiber. Moreover, several optical fibers can be bundled into a small space. Accordingly, the optical data connection between the control and analysis circuit and the chip connection circuit can easily be scaled up with an increasing number of qubits.

Optical data connections are less susceptible to cross-talk between different signals, for example to cross-talk between different fibers compared to cross-talk between different conductors. Thus, control and/or computation errors due to cross-talk between different signals generated by the control and analysis circuit and/or different read-out signals received from the qubits are reduced.

Optical data connections provide a lower latency than a purely electrical connection between the control and analysis circuit and the qubits. This improves the fidelity of the qubits and thus reduces the necessary computation time and/or computational errors.

Optical data connections provide galvanic isolation between the control and analysis circuit and the chip connection circuit, and thus between the control and analysis circuit and the qubits of the quantum computer chip. This way, unwanted influences of spurious electrical signals are reduced, thereby enhancing the fidelity of the qubits and the computational accuracy.

According to an aspect of the present disclosure, the first converter circuit, for example, is immediately connected with the control and analysis circuit, and/or wherein the second converter circuit is immediately connected with the chip connection circuit. In other words, no further electronic components may be provided between the first converter circuit and the control and analysis circuit. Alternatively or additionally, no further electronic components may be provided between the second converter circuit and the chip connection circuit.

In an embodiment, the plurality of electrical signals generated by the control and analysis circuit comprises a plurality of control signals and/or a plurality of read-out request signals.

In general, the control signals may be configured to control the respective qubits to enter a predetermined quantum state. In other words, the control signals are configured to set quantum states of the respective qubits.

In an embodiment, the read-out request signals may be configured to initiate a read-out of the quantum states of the respective qubits. In an embodiment, the read-out may be initiated by the read-out request signals, and the corresponding electrical read-out signals of the qubits may then be obtained by the chip connection circuit.

According to another aspect of the present disclosure, the optical data connection, for example, comprises at least one optical fiber. Accordingly, the plurality of optical signals and/or the plurality of optical read-out signals may be transmitted between the first converter circuit and the second converter circuit via the at least one optical fiber.

In an embodiment, the optical data connection may comprise a plurality of optical fibers. Thus, the number of optical signals and/or optical read-out signals that can be transmitted is increased, thereby further enhancing the scalability of the quantum computer system.

In another embodiment, the transmission module comprises a plurality of transmission channels. In general, different signals generated by the control and analysis circuit, for example different control signals and/or different read-out request signals, may be transmitted via different transmission channels, thereby significantly reducing cross-talk between the signals.

Likewise, different read-out signals may be transmitted via different transmission channels, thereby significantly reducing cross-talk between the signals. For example, the different transmission channels may have a different carrier frequency onto which the respective signal to be transmitted is modulated. Alternatively or additionally, the different transmission channels may correspond to physically different optical fibers.

In an embodiment, a certain number of control signals may be transmitted via the same transmission channel, for example in a frequency-multiplexed manner. In other words, the certain number of qubits may receive the control signals via the same transmission channel. For example, 2, 4, 8, or 16 control signals may be transmitted via the same transmission channel. However, it is to be understood that any other number of control signals may be transmitted via the same transmission channel.

Likewise, a certain number of read-out request signals may be transmitted via the same transmission channel, for example in a frequency-multiplexed manner. In other words, the certain number of qubits may receive the read-out request signals via the same transmission channel. For example, 2, 4, 8, or 16 read-out request signals may be transmitted via the same transmission channel. However, it is to be understood that any other number of read-out request signals may be transmitted via the same transmission channel.

In an embodiment, a certain number of read-out signals may be transmitted via the same transmission channel, for example in a frequency-multiplexed manner. In other words, the certain number of qubits may be read out via the same transmission channel. For example, 2, 4, 8, or 16 read-out signals may be transmitted via the same transmission channel. However, it is to be understood that any other number of read-out signals may be transmitted via the same transmission channel.

An aspect of the present disclosure provides that the transmission module, for example, comprises a first multiplexer. In an embodiment, the first multiplexer is configured to multiplex the plurality of electrical signals. Alternatively, the first multiplexer is configured to multiplex the plurality of optical signals obtained by the first converter circuit. In general, multiplexing allows for efficiently transmitting the plurality of optical signals via the transmission module, namely via the optical data connection, thereby significantly increasing the scalability of the quantum computer system, namely the scalability with respect to increasing numbers of qubits.

In an embodiment, the first multiplexer may be configured to apply any suitable multiplexing technique to the plurality of electrical signals or to the plurality of optical signals. For example, the first multiplexer may be configured to multiplex the plurality of electrical signals or the plurality of optical signals by a space-division multiplexing technique. As another example, the first multiplexer may be configured to multiplex the plurality of electrical signals or the plurality of optical signals by a frequency-division multiplexing technique.

According to another aspect of the present disclosure, the transmission module, for example, comprises a first de-multiplexer, wherein the first de-multiplexer and the first multiplexer are arranged on opposite ends of the optical data connection. In an embodiment, the first de-multiplexer is configured to de-multiplex the plurality of optical signals received via the optical data connection. Alternatively, the first de-multiplexer is configured to de-multiplex the plurality of electrical signals obtained by the second converter circuit.

In an embodiment, the first de-multiplexer may be configured to apply any suitable de-multiplexing technique to the plurality of optical signals or to the plurality of electrical signals. For example, the first de-multiplexer may be configured to de-multiplex the plurality of optical signals or the plurality of electrical signals by a space-division de-multiplexing technique. As another example, the first de-multiplexer may be configured to de-multiplex the plurality of optical signals or the plurality of electrical signals by a frequency-division de-multiplexing technique.

In an embodiment, the transmission module may comprise a second multiplexer. The second multiplexer is configured to multiplex the plurality of electrical read-out signals obtained by the chip connection circuit. Alternatively, the second multiplexer is configured to multiplex the plurality of optical read-out signals obtained by the second converter circuit. In general, multiplexing allows for efficiently transmitting the plurality of read-out signals via the transmission module, namely via the optical data connection, thereby significantly increasing the scalability of the quantum computer system, namely the scalability with respect to increasing numbers of qubits.

In an embodiment, the second multiplexer may be configured to apply any suitable multiplexing technique to the plurality of electrical signals or to the plurality of optical signals. For example, the first multiplexer may be configured to multiplex the plurality of electrical read-out signals or the plurality of optical read-out signals by a space-division multiplexing technique. As another example, the second multiplexer may be configured to multiplex the plurality of electrical read-out signals or the plurality of optical read-out signals by a frequency-division multiplexing technique.

In an embodiment, the transmission module comprises a second de-multiplexer, wherein the second de-multiplexer and the second multiplexer are arranged on opposite ends of the optical data connection. The second de-multiplexer is configured to de-multiplex the plurality of optical read-out signals received via the optical data connection. Alternatively, the second de-multiplexer is configured to de-multiplex the plurality of electrical read-out signals obtained by the first converter circuit.

In an embodiment, the second de-multiplexer may be configured to apply any suitable de-multiplexing technique to the plurality of optical read-out signals or to the plurality of electrical read-out signals. For example, the second de-multiplexer may be configured to de-multiplex the plurality of optical read-out signals or the plurality of electrical read-out signals by a space-division de-multiplexing technique. As another example, the second de-multiplexer may be configured to de-multiplex the plurality of optical read-out signals or the plurality of electrical read-out signals by a frequency-division de-multiplexing technique.

In an embodiment, the chip connection circuit is configured to be electrically connected to the quantum computer chip. In other words, there may be direct electrical connections between the chip connection circuit and the quantum computer chip, or more precisely the qubits of the quantum computer chip. Via these electrical connections, the electrical signals generated by the control and analysis circuit can be applied to the qubits. Further, via these electric connections, the electrical read-out signals can be obtained from the qubits.

In an embodiment, the quantum computer system may further comprise a cryostat, wherein the cryostat has a housing, and wherein the chip connection circuit is arranged within the housing. In general, the cryostat is configured to cool the quantum computer chip to a suitable operating temperature for the qubits.

In an embodiment, the cryostat may comprise a plurality of cooling stages that correspond to a plurality of temperature zones of the cryostat. Each cooling stage successively reduces the temperature, wherein the quantum computer chip may be arranged in the lowest-temperature zone.

According to an aspect of the present disclosure, the second converter circuit, for example, is arranged on an outside of the housing. In an embodiment, the second converter circuit may be mounted to the housing on the outside of the housing.

Thus, instead of transmitting the electrical signals from the control and analysis circuit to the cryostat via electrical connections, a large portion of the transmission line can be covered by the optical data connection of the transmission module.

Likewise, instead of transmitting the electrical read-out signals from the cryostat to the control and analysis circuit via electrical connections, a large portion of the transmission line can be covered by the optical data connection of the transmission module.

According to another aspect of the present disclosure, the second converter circuit, for example, is arranged within the housing. Accordingly, the length of the electrical connections from the second converter circuit to the quantum computer chip or to the qubits is reduced even further.

An aspect of the present disclosure provides that the cryostat, for example, has a plurality of temperature zones. In an embodiment, the plurality of temperature zones comprises a first temperature zone and a second temperature zone being different from the first temperature zone, wherein the first temperature zone is configured to accommodate the quantum computer chip, and wherein the second converter circuit is arranged in the second temperature zone. In an embodiment, a temperature of the first temperature zone may be lower than a temperature of the second temperature zone. In other words, the second converter circuit may be arranged in a temperature zone that has higher temperature compared to the temperature zone in which the qubits are arranged.

In an embodiment, the cryostat has a plurality of temperature zones, wherein the plurality of temperature zones comprises a first temperature zone, wherein the first temperature zone is configured to accommodate the quantum computer chip, and wherein the second converter circuit is arranged in the first temperature zone. In other words, both the second converter circuit and the qubits may be arranged in the same temperature zone of the cryostat.

In an embodiment, the quantum computer system may further comprise the quantum computer chip, wherein the quantum computer chip is arranged in the cryostat, and wherein the chip connection circuit is immediately connected to the quantum computer chip. Accordingly, no further electronic components may be arranged between the chip connection circuit and the quantum computer chip.

Embodiments of the present disclosure further provide a method of operating a quantum computer chip. In an embodiment, the method comprises:

- generating, by a control and analysis circuit, a plurality of electrical signals for a plurality of qubits of the quantum computer chip;
- converting, by a first converter circuit, the plurality of electrical signals into a plurality of optical signals;
- transmitting, by an optical data connection, the plurality of optical signals from the first converter circuit to a second converter circuit;
- converting, by the second converter circuit, the plurality of optical signals back into the plurality of electrical signals; and
- applying, by a chip connection circuit, the plurality of electrical signals to the quantum computer chip.

In an embodiment, the quantum computer system according to any one of the embodiments described above may be configured to perform the method of operating a quantum computer chip.

Regarding the advantages and further properties of the method of operating a quantum computer chip, reference is made to the explanations given above with respect to the quantum computer control system, which also hold for the method of operating a quantum computer chip and vice versa.

In an embodiment, the method may further comprise:

- obtaining, by the chip connection circuit, a plurality of electrical read-out signals from the quantum computer chip;
- converting, by the second converter circuit, the plurality of electrical read-out signals into a plurality of optical read-out signals;
- transmitting, by the optical data connection, the plurality of optical signals from the second converter circuit to the first converter circuit;
- converting, by the first converter circuit, the plurality of optical read-out signals back into the plurality of electrical read-out signals; and
- analyzing, by the control and analysis circuit, the plurality of electrical read-out signals.

In an embodiment, the quantum computer system according to any one of the embodiments described above may be configured to perform the further steps described above.

According to an aspect of the present disclosure, the plurality of electrical signals generated by the control and analysis circuit, for example, comprises a plurality of control signals and/or a plurality of read-out request signals.

In general, the control signals may be configured to control the respective qubits to enter a predetermined quantum state. In other words, the control signals are configured to set quantum states of the respective qubits.

The read-out request signals may be configured to initiate a read-out of the quantum states of the respective qubits. In an embodiment, the read-out may be initiated by the read-out request signals, and the corresponding electrical read-out signals of the qubits may then be obtained by the chip connection circuit.

In an embodiment, the plurality of optical signals are transmitted via different optical channels. Alternatively or additionally, the plurality of optical read-out signals are transmitted via different optical channels. Thus, the number of optical signals and/or optical read-out signals that can be transmitted is enhanced, thereby further enhancing the scalability of the quantum computer system according to the present disclosure.

For example, the different optical channels may have a different carrier frequency onto which the respective signal to be transmitted is modulated. Alternatively or additionally, the different optical channels may correspond to physically different optical fibers.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 4 shows an example of a flow chart of a method of operating a quantum computer chip according to an embodiment of the present disclosure.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
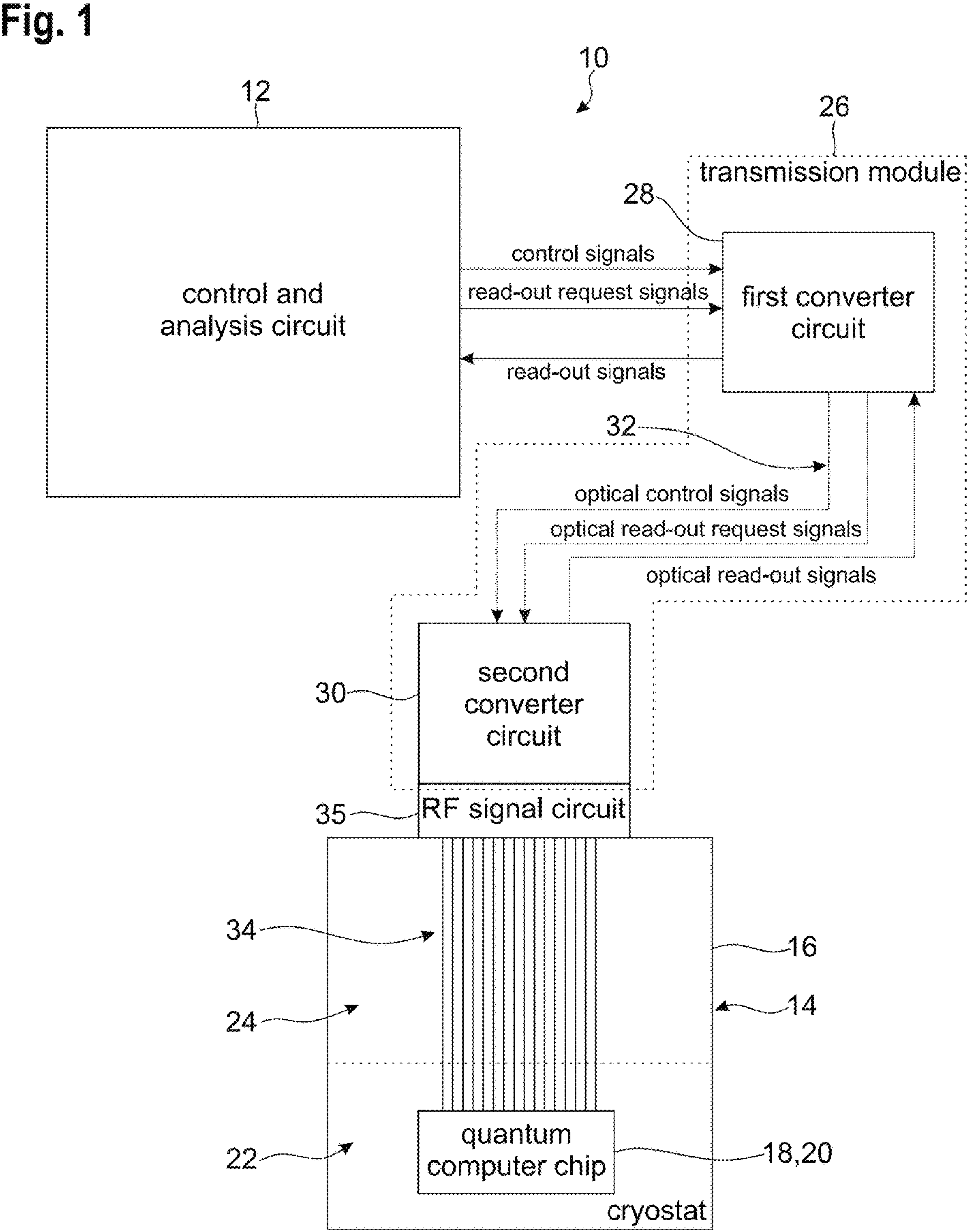
FIG. 1 schematically shows a quantum computer system according to an embodiment of the present disclosure.

FIG. 1 schematically shows a quantum computer system 10 in accordance with an embodiment of the present disclosure. As shown in FIG. 1, the quantum computer system comprises a control and analysis circuit 12 and a cryostat 14 having a housing 16. Within the housing 16 of the cryostat 14, a quantum computer chip 18 having a plurality of qubits 20 is arranged.

In an embodiment, the cryostat 14 may have a first temperature zone 22 and at least a second temperature zone 24, wherein the quantum computer chip 18 is arranged in the first temperature zone. In an embodiment, the temperature of the first temperature zone 22 may be lower than a temperature of the second temperature zone 24. It is noted that, of course, the cryostat 14 comprises cooling equipment that is configured to reduce a temperature within the cryostat to an operating temperature of the qubits 20.

In an embodiment, the cryostat 14 may have several pieces of cooling equipment in the different temperature zones 22, 24, wherein the different pieces of cooling equipment successively reduce the temperature of the respective zone. For ease of illustration, the cooling equipment is not shown in FIG. 1.

In general, the control and analysis circuit 12 is configured to generate a plurality of electrical signals for the plurality of qubits 20 of the quantum computer chip 18. In an embodiment, the electrical signal generated by the control and analysis circuit 12 comprise electrical control signals and/or electrical read-out request signal. The control signals may be configured to control the respective qubits 20 to enter a predetermined quantum state. In other words, the control signals are configured to set quantum states of the respective qubits 20. The read-out request signals may be configured to initiate a read-out of the quantum states of the respective qubits 20. The electrical signals may be radio frequency (RF) signals having a frequency in the microwave regime, e.g. 300 MHz or higher.

In an embodiment, the control and analysis circuit 12 further is configured to analyze a plurality of electrical read-out signals received from the plurality of qubits 20 in response to the electrical read-out request signals applied to the qubits 20.

Between the control and analysis circuit 12 and the cryostat 14, a transmission module 26 is provided. In general, the transmission module 26 is configured to transmit the electrical signals generated by the control and analysis circuit 12 to the cryostat. This allows, for example, the control and analysis circuit 12 to be in one location, such as a laboratory office, and the cryostat to be in another location, such as another laboratory room. In an embodiment, the transmission module 26 is further configured to transmit the electrical read-out signals obtained from the qubits 20 from the cryostat 14 to the control and analysis circuit 12.

In the embodiment shown in FIG. 1, the transmission module 26 comprises a first converter circuit 28 and a second converter circuit 30 that are connected to each other by an optical data connection 32. Therein, the first converter circuit 28 May be arranged adjacent to the control and analysis circuit 12. In an embodiment, the control and analysis circuit 12 and the first converter circuit 28 may be integrated into a common computer device.

The second converter circuit 30 shown in the example embodiment of FIG. 1 is mounted to the housing 16 of the cryostat 14. For example, the second converter circuit 30 is mounted to an outside of the housing 16 of the cryostat 14. However, it is to be understood that, alternatively, the second converter circuit 30 may be provided within the cryostat 14, for example in the second temperature zone 24 or n the first temperature zone 22.

The first converter circuit 28 and the second converter circuit 30 are connected to each other in a signal-transmitting manner via the optical data connection 32. The optical data connection 32 may comprise at least one optical fiber, for example a plurality of optical fibers.

It is noted that in the FIGURES, electrical data connections are indicated by solid lines, while optical data connections are indicated by dotted lines.

In an embodiment, the first converter circuit 28 comprises at least one electro-optical converter that is configured to convert the electrical signals generated by the control and analysis circuit 12 into corresponding optical signals, which are then transmitted to the second converter circuit 30 via the optical data connection 32. For example, the first converter circuit 28 may comprise a 100G QSFP Ethernet converter that is configured to convert the electrical signals into the optical signals. However, it is to be understood that the first converter circuit 28 may comprise any other suitable type of electro-optical converter.

In an embodiment, the second converter circuit 30 comprises at least one opto-electrical converter that is configured to convert the optical signals received from the first converter circuit 28 back into the electrical signals. The at least one opto-electrical converter may be established as a 100G QSFP Ethernet converter or as any other suitable type of opto-electrical converter.

In an embodiment, the second converter circuit 30 comprises at least one electro-optical converter that is configured to convert electrical read-out signals received from the qubits 20 into corresponding optical read-out signals, which are then transmitted to the first converter circuit 28 via the optical data connection 32.

In an embodiment, the first converter circuit 28 comprises at least one opto-electrical converter that is configured to convert the optical read-out signals received from the second converter circuit 30 back into the electrical read-out signals. The at least one opto-electrical converter may be established as a 100G QSFP Ethernet converter or as any other suitable type of opto-electrical converter.

In an embodiment, the quantum computer system 10 further comprises a chip connection circuit 34 that electrically connects the second converter circuit 30 to the quantum computer chip 18, for example to the qubits 20. In general, the chip connection circuit 34 is configured to apply the electrical signals generated by the control and an analysis circuit 12 to the qubits 20. Moreover, the chip connection circuit 34 is configured to obtain electrical read-out signals from the qubits 20.

It is noted that the electrical signals generated by the control and analysis circuit 12 may be digital signals and/or may not have a frequency that is suitable for controlling and/or reading out the qubits 20.

Between the second converter circuit 32 and the chip connection circuit 34, a radio frequency (RF) signal circuit 35 may be provided. The RF signal circuit 35 may comprise at least one digital-to-analog converter (DAC), for example a plurality of DACs, being configured to convert the electrical signals obtained by the second converter circuit 30 into analog electrical signals.

In an embodiment, the RF signal circuit 35 may further comprise at least one mixer circuit. The at least one mixer circuit is configured to adapt a frequency of the (analog) electrical signals to a frequency suitable for controlling and/or reading out the qubits 20, namely by mixing the (analog) electrical signals with a local oscillator signal.

In an embodiment, the RF signal circuit 35 may comprise at least one further mixer circuit. The at least one further mixer circuit is configured to adapt a frequency of the electrical read-out signals obtained by the chip connection circuit 34 from the qubits 20 to a frequency that is suitable for processing by the control and analysis circuit 12.

Therein, the electrical read-out signals may be analog signals.

In an embodiment, the RF signal circuit 35 may comprise at least one analog-to-digital converter (ADC), for example a plurality of ADCs, being configured to convert the electrical read-out signals obtained by the chip connection circuit 34 into analog electrical signals, for example after frequency-conversion by the at least one further mixer circuit.

Figure 2:
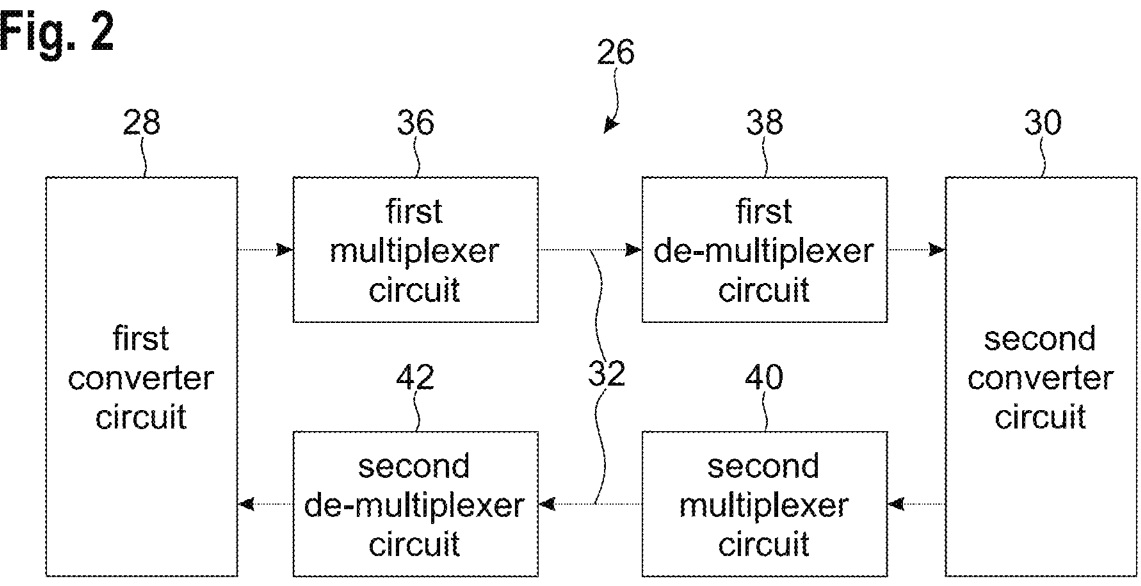
FIG. 2 schematically shows an example of a transmission module of the quantum computer system of FIG. 1.

FIG. 2 shows another embodiment of the transmission module 26 described above in more detail. In this example, the transmission module 26 further comprises a first multiplexer circuit 36 that is provided immediately downstream of the first converter circuit 28. The transmission module 26 further comprises a first de-multiplexer circuit 38 that is provided immediately upstream of the second converter circuit 30.

In an embodiment shown in FIG. 2, the first multiplexer circuit 36 and the first de-multiplexer circuit 38 are connected to each other via the optical data connection 32. The first multiplexer circuit 36 is configured to multiplex the plurality of optical signals corresponding to the electrical signals generated by the control and an analysis circuit 12 prior to transmission via the optical data connection 32.

For example, the first multiplexer circuit 36 may employ any suitable type of space-multiplexing technique, e.g. transmitting via different optical fibers, and/or any suitable type of frequency-multiplexing technique, e.g. modulating different optical signals onto different carrier frequencies.

The first de-multiplexer circuit 38 is configured to de-multiplex the plurality of optical signals received from the first multiplexer circuit 36, namely by employing a corresponding de-multiplexing technique.

In an embodiment, the transmission module 26 further comprises a second multiplexer circuit 40 that is provided immediately downstream of the second converter circuit 30. Moreover, the transmission module 26 comprises a second de-multiplexer circuit 42 that is provided immediately upstream of the first converter circuit 28. The second multiplexer circuit 36 and the second de-multiplexer circuit 38 are connected to each other via the optical data connection 32.

In an embodiment, the second multiplexer circuit 40 is configured to multiplex the plurality of optical read-out signals corresponding to the electrical read-out signals received from the qubits 20 prior to transmission via the optical data connection 32.

For example, the second multiplexer circuit 40 may employ any suitable type of space-multiplexing technique, e.g. transmitting via different optical fibers, and/or any suitable type of frequency-multiplexing technique, e.g. modulating different optical signals onto different carrier frequencies.

The second de-multiplexer circuit 42 is configured to de-multiplex the plurality of optical signals received from the second multiplexer circuit 40, namely by employing a corresponding de-multiplexing technique.

Figure 3:
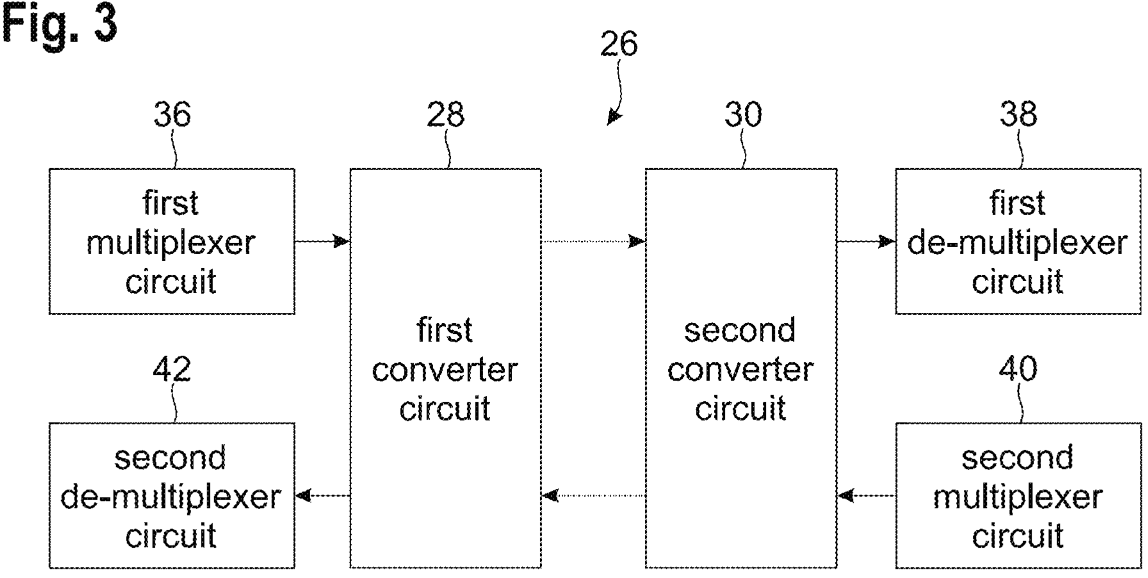
FIG. 3 schematically shows another example of a transmission module of the quantum computer system of FIG. 1.

FIG. 3 shows another embodiment of the transmission module 26, wherein only the differences to the embodiment described above with reference to FIG. 2 are explained hereinafter.

In this example, the first multiplexer circuit 36 is provided immediately upstream of the first converter circuit 28, such that the electrical signals generated by the control and an analysis circuit 12 are multiplexed prior to conversion into optical signals.

The first de-multiplexer circuit 38 is provided immediately downstream of the second converter circuit 30, such that the electrical signals obtained by the second converter circuit 30 based on the optical signals are de-multiplexed by the first de-multiplexer circuit 38.

The second multiplexer circuit 40 is provided immediately upstream of the second converter circuit 30, such that the electrical read-out signals received from the qubits 20 are multiplexed prior to conversion into optical signals.

The second de-multiplexer circuit 42 is provided immediately downstream of the first converter circuit 28, such that the electrical read-out signals obtained by the first converter circuit 28 based on the optical read-out signals are de-multiplexed by the second de-multiplexer circuit 42.

The quantum computer system 10 according to any of the embodiments described above is configured to perform a method of operating the quantum computer chip 18, an example of which is described hereinafter with reference to FIG. 4.

A plurality of electrical signals are generated by the control and analysis circuit for the plurality of qubits 20 of the quantum computer chip 18 (step S1). As already mentioned above, the plurality of electrical signals may comprise control signals and/or read-out request signals. The plurality of electrical signals is forwarded to the first converter circuit 28.

The plurality of electrical signals is converted into a plurality of corresponding optical signals by the first converter circuit 28 (step S2). Optionally, the electrical signals may be multiplexed by the first multiplexer circuit 36 prior to conversion into optical signals. Alternatively, the optical signals obtained by the first converter circuit 28 may be multiplexed by the first multiplexer circuit 36.

The optical signals are transmitted from the first converter circuit 28 to the second converter circuit 30 via the optical data connection 32 (step S3). The plurality of optical signals may be transmitted via a plurality of different optical channels of the optical data connection 32, i.e. via different optical fibers and/or with different carrier frequencies.

The plurality of optical signals is converted back into the plurality of electrical signals by the second converter circuit 30 (step S4). The electrical signals obtained by the second converter circuit 30 may be de-multiplexed by the first de-multiplexer circuit 38. Alternatively, the plurality of optical signals received via the optical data connection 32 may be de-multiplexed by the first de-multiplexer circuit 38 prior to conversion back into the plurality of electrical signals.

The plurality of electrical signals may be converted into analog signals and/or frequency-shifted by the RF signal circuit 35 (step S5).

The resulting electrical signals are applied to the quantum computer chip 18, or more precisely to the qubits 20, by the chip connection circuit 34 (step S6).

If the respective electrical signal is a control signal, the respective electrical signal being applied to the respective qubit 20 controls the qubit 20 to enter a predetermined quantum state. If the respective electrical signal is a read-out request signal, the respective electrical signal being applied to the respective qubit 20 initiates a read-out of the quantum state of the respective qubit 20.

The corresponding electrical read-out signals of the qubits 20 are obtained by the chip connection circuit 34 (step S7).

The electrical read-out signals may be frequency-adjusted and/or converted into digital signals by the RF signal circuit 35 (step S8).

The resulting electrical read-out signals are converted into optical read-out signals by the second converter circuit 30, and are transmitted to the first converter circuit via the optical data connection 32 (step S9).

Optionally, the electrical read-out signals may be multiplexed by the second multiplexer circuit 40 prior to conversion into optical signals.

Alternatively, the optical read-out signals obtained by the second converter circuit 30 may be multiplexed by the second multiplexer circuit 40.

In an embodiment, the plurality of optical read-out signals may be transmitted via a plurality of different optical channels of the optical data connection 32, i.e. via different optical fibers and/or with a different carrier frequencies.

The plurality of optical read-out signals is converted back into the plurality of electrical read-out signals by the first converter circuit 28 (step S10). The electrical read-out signals obtained by the first converter circuit 28 may be de-multiplexed by the second de-multiplexer circuit 42.

Alternatively, the plurality of optical read-out signals received via the optical data connection 32 may be de-multiplexed by the second de-multiplexer circuit 42 prior to conversion back into the plurality of electrical read-out signals.

The plurality of electrical read-out signals is transmitted to the control and analysis circuit 12.

The plurality of electrical read-out signals is analyzed by the control and analysis circuit 12 (step S11). In an embodiment, the quantum states of the qubits 20 may be determined by the control and analysis circuit 12 based on the electrical read-out signals, and corresponding computational data may be generated based on the quantum states determined.

Certain embodiments disclosed herein include systems, apparatus, modules, units, devices, components, etc., that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a graphics processing unit (GPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

For example, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implementing the functionality described herein.

Of course, in an embodiment, two or more of these components, or parts thereof, can be integrated or share hardware and/or software, circuitry, etc. In an embodiment, these components, or parts thereof, may be grouped in a single location or distributed over a wide area. In circumstances where the components are distributed, the components are accessible to each other via communication links.

In an embodiment, one or more of the components, such as the control and analysis circuit 12, the transmission module 26, etc., referenced above include circuitry programmed to carry out one or more steps of any of the methods disclosed herein. In an embodiment, one or more computer-readable media associated with or accessible by such circuitry contains computer readable instructions embodied thereon that, when executed by such circuitry, cause the component or circuitry to perform one or more steps of any of the methods disclosed herein.

In an embodiment, the computer readable instructions includes applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably).

In an embodiment, computer-readable media is any medium that stores computer readable instructions, or other information non-transitorily and is directly or indirectly accessible by a computing device, such as processor circuitry, etc., or other circuitry disclosed herein etc. In other words, a computer-readable medium is a non-transitory memory at which one or more computing devices can access instructions, codes, data, or other information. As a nonlimiting example, a computer-readable medium may include a volatile random access memory (RAM), a persistent data store such as a hard disk drive or a solid-state drive, or a combination thereof. In an embodiment, memory can be integrated with a processor, separate from a processor, or external to a computing system.

Accordingly, blocks of the block diagrams and/or flowchart illustrations support various combinations for performing the specified functions, combinations of operations for performing the specified functions and program instructions for performing the specified functions. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

It will be appreciated that in one or more embodiments, the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), a graphics processing unit (GPU) or the like, or any combinations thereof.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

Although the method and various embodiments thereof have been described as performing sequential steps, the claimed subject matter is not intended to be so limited. As nonlimiting examples, the described steps need not be performed in the described sequence and/or not all steps are required to perform the method. Moreover, embodiments are contemplated in which various steps are performed in parallel, in series, and/or a combination thereof. As such, one of ordinary skill will appreciate that such examples are within the scope of the claimed embodiments.

In the detailed description herein, references to "one embodiment", "an embodiment", "an example embodiment", etc., indicate that the embodiment described may include a particular feature, structure, or characteristic, but every embodiment May not necessarily include the particular feature, structure, or characteristic. Moreover, such phrases are not necessarily referring to the same embodiment. In addition, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Thus, it will be appreciated that embodiments of the present disclosure may employ any combination of features described herein. All such combinations or sub-combinations of features are within the scope of the present disclosure.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A quantum computer system, comprising:

a control and analysis circuit, a transmission module, a plurality of qubits of a quantum computer chip, a chip connection circuit, and a cryostat having a housing, wherein the control and analysis circuit is configured to:

generate a plurality of electrical signals for the plurality of qubits of the quantum computer chip, and analyze a plurality of electrical read-out signals received from the plurality of qubits of the quantum computer chip, wherein the chip connection circuit is configured to:

apply the plurality of electrical signals to the plurality of qubits of the quantum computer chip, and obtain the plurality of electrical read-out signals from the plurality of qubits of the quantum computer chip, wherein the transmission module comprises an optical data connection, a first converter circuit, and a second converter circuit, wherein the optical data connection connects the first converter circuit and the second converter circuit, wherein the optical data connection is configured to transmit optical signals between the first converter circuit and the second converter circuit, wherein the first converter circuit is configured to convert the plurality of electrical signals generated by the control and analysis circuit into a plurality of optical signals, wherein the second converter circuit is configured to convert the plurality of optical signals back into the plurality of electrical signals, wherein the second converter circuit further is configured to convert the plurality of electrical read-out signals obtained by the chip connection circuit into a plurality of optical read-out signals, wherein the first converter circuit further is configured to convert the plurality of optical read-out signals back into the plurality of electrical read-out signals, wherein the chip connection circuit is arranged within the housing, and wherein the second converter circuit is arranged according to one of:

(a) the second converter circuit is arranged on an outside of the housing;

(b) the cryostat has a plurality of temperature zones, wherein the plurality of temperature zones comprises a first temperature zone, wherein the first temperature zone is configured to accommodate the quantum computer chip, and wherein the second converter circuit is arranged in the first temperature zone; or (c) the cryostat has a plurality of temperature zones, wherein the plurality of temperature zones comprises a first temperature zone and a second temperature zone being different from the first temperature zone, wherein the first temperature zone is configured to accommodate the quantum computer chip, and wherein the second converter circuit is arranged in the second temperature zone.

2. The quantum computer system of claim 1, wherein the first converter circuit is immediately connected with the control and analysis circuit, or wherein the second converter circuit is immediately connected with the chip connection circuit.

3. The quantum computer system of claim 1, wherein the plurality of electrical signals generated by the control and analysis circuit comprises a plurality of control signals or a plurality of read-out request signals.

4. The quantum computer system of claim 1, wherein the optical data connection comprises at least one optical fiber.

5. The quantum computer system of claim 1, wherein the transmission module comprises a plurality of transmission channels.

6. The quantum computer system of claim 1, wherein the transmission module comprises a first multiplexer, wherein the first multiplexer is configured to multiplex the plurality of electrical signals, or wherein the first multiplexer is configured to multiplex the plurality of optical signals obtained by the first converter circuit.

7. The quantum computer system of claim 6, wherein the transmission module comprises a first de-multiplexer, wherein the first de-multiplexer and the first multiplexer are arranged on opposite ends of the optical data connection, wherein the first de-multiplexer is configured to de-multiplex the plurality of optical signals received via the optical data connection, or wherein the first de-multiplexer is configured to de-multiplex the plurality of electrical signals obtained by the second converter circuit.

8. The quantum computer system of claim 1, wherein the transmission module comprises a multiplexer, wherein the multiplexer is configured to multiplex the plurality of electrical read-out signals obtained by the chip connection circuit, or wherein the multiplexer is configured to multiplex the plurality of optical read-out signals obtained by the second converter circuit.

9. The quantum computer system of claim 8, wherein the transmission module comprises a de-multiplexer, wherein the de-multiplexer and the multiplexer are arranged on opposite ends of the optical data connection, wherein the de-multiplexer is configured to de-multiplex the plurality of optical read-out signals received via the optical data connection, or wherein the de-multiplexer is configured to de-multiplex the plurality of electrical read-out signals obtained by the first converter circuit.

10. The quantum computer system of claim 1, wherein the chip connection circuit is configured to be electrically connected to the quantum computer chip.

11. The quantum computer system of claim 1, further comprising the quantum computer chip, wherein the quantum computer chip is arranged in the cryostat, and wherein the chip connection circuit is immediately connected to the quantum computer chip.

12. A method of operating a quantum computer chip, the method comprising:

generating, by a control and analysis circuit, a plurality of electrical signals for a plurality of qubits of the quantum computer chip, wherein the electrical signals generated by the control and analysis circuit comprise electrical control signals being configured to control the qubits to enter a predetermined quantum state or electrical read-out request signals configured to initiate a read-out of quantum states of the qubits;

converting, by a first converter circuit, the plurality of electrical signals into a plurality of optical signals;

transmitting, by an optical data connection, the plurality of optical signals from the first converter circuit to a second converter circuit;

converting, by the second converter circuit, the plurality of optical signals back into the plurality of electrical signals comprising the electrical control signals being configured to control the qubits to enter the predetermined quantum state or the electrical read-out request signals configured to initiate the read-out of quantum states of the qubits; and applying, by a chip connection circuit, the plurality of electrical signals to the quantum computer chip.

13. The method of claim 12, further comprising:

obtaining, by the chip connection circuit, a plurality of electrical read-out signals from the quantum computer chip;

converting, by the second converter circuit, the plurality of electrical read-out signals into a plurality of optical read-out signals;

transmitting, by the optical data connection, the plurality of optical signals from the second converter circuit to the first converter circuit;

converting, by the first converter circuit, the plurality of optical read-out signals back into the plurality of electrical read-out signals; and analyzing, by the control and analysis circuit, the plurality of electrical read-out signals.

14. The method of claim 12, wherein the plurality of electrical signals generated by the control and analysis circuit comprises a plurality of control signals or a plurality of read-out request signals.

15. The method of claim 12, wherein the plurality of optical signals are transmitted via different optical channels, and/or wherein the plurality of optical read-out signals are transmitted via different optical channels.

16. A quantum computer system, comprising:

a control and analysis circuit, a transmission module, a plurality of qubits of a quantum computer chip, and a chip connection circuit, wherein the control and analysis circuit is configured to:

generate a plurality of electrical signals for the plurality of qubits of the quantum computer chip, wherein the electrical signals generated by the control and analysis circuit comprise electrical control signals being configured to control the qubits to enter a predetermined quantum state and/or electrical read-out request signals configured to initiate a read-out of quantum states of the qubits, and analyze a plurality of electrical read-out signals received from the plurality of qubits of the quantum computer chip, wherein the chip connection circuit is configured to:

apply the plurality of electrical signals to the plurality of qubits of the quantum computer chip, and obtain the plurality of electrical read-out signals from the plurality of qubits of the quantum computer chip, wherein the transmission module comprises an optical data connection, a first converter circuit, and a second converter circuit, wherein the optical data connection connects the first converter circuit and the second converter circuit, wherein the optical data connection is configured to transmit optical signals between the first converter circuit and the second converter circuit, wherein the first converter circuit is configured to convert the plurality of electrical signals generated by the control and analysis circuit into a plurality of optical signals, wherein the second converter circuit is configured to convert the plurality of optical signals back into the plurality of electrical signals comprising the electrical control signals being configured to control the qubits to enter the predetermined quantum state and/or the electrical read-out request signals configured to initiate the read-out of quantum states of the qubits, wherein the second converter circuit further is configured to convert the plurality of electrical read-out signals obtained by the chip connection circuit into a plurality of optical read-out signals, and wherein the first converter circuit further is configured to convert the plurality of optical read-out signals back into the plurality of electrical read-out signals.

* * * * *